Patented July 11, 1944

2,353,307

UNITED STATES PATENT OFFICE 2,353,307

ICING

Julian A. Joffe, Mount Vernon, N. Y.

No Drawing. Application January 2, 1941,
Serial No. 372,833

1 Claim. (Cl. 99—139)

This invention relates to new and useful improvements in icing and more particularly to hard or royal icing for decorating chocolate.

In order to insure firm adherence of icing to chocolate, it has been the practice to provide the chocolate with an adhesive coating and to add egg-white to the icing. Even with egg-white, where gums, starches, gelatines or the like are used, no satisfactory hard or royal icing could heretofore be produced which would adhere tenaciously directly to a chocolate surface and dry rapidly enough for commercial purposes.

A shellac or glue coated chocolate is objectionable from the standpoints of alcohol adulterant qualities, expense of application, and of cost of materials, and there are many objections to the use of egg-white. It is very expensive. It has an unpleasant odor which must be masked by the addition of strong flavoring to the icing. Furthermore, icing containing egg-white will blacken and form a black ring on the inside surface of the can containing it. On account of the expensiveness of egg-white, it was sparingly used and was supplemented with gums, starches, light starches, dextrines, etc. Such icing, however, separated and decomposed, and what is more important, promoted mold formation on the icing while stored.

The object of the present invention is to produce an icing having all the merits of one containing egg-white but none of the drawbacks and yet adhere more tenaciously to the surface of chocolate and dry more rapidly.

This is accomplished by substituting for the egg-white a small quantity of a soy bean protein. Best results were obtained with a soy bean derivative marketed under the trade name "Albusoy".

The composition of Albusoy is 92 per cent proteins, 1 per cent ash and 7 per cent moisture. The composition of egg-white, though somewhat variable, is of the same general nature, but its proteins are of a different type.

The use of about ¼ per cent (by weight) of such soy bean protein in icing gave fair results, and excellent royal icing was produced which contained less than 3 per cent of this substance.

A commercial hard or royal icing was produced by me which was superior to any egg-white containing icing on the market and which contained (by weight) 81.09 per cent sugar, 2.51 per cent corn starch, 2.3 per cent soy bean protein, 0.1 per cent gum tragacanth, 1.83 per cent gum arabic, 0.05 per cent citric acid, 0.1 per cent benzoate of soda, and 12 per cent (by volume) of water.

The starch was present in the usual XXXX non-caking cane sugar to prevent caking while in storage. As far as the icing is concerned, no starch is required, though neither corn starch nor other edible starches are objectionable, except in so far as mold growth is concerned.

The ingredients were prepared and mixed together in the following manner to produce approximately 240 pounds of icing:

The gum arabic was first vigorously stirred into water by starting with about half the quantity and then gradually adding the other half. A total of 70 ounces of gum arabic was stirred into 88 ounces of water after the addition of the above mentioned percentages of citric acid and benzoate of soda, the mixture was left standing for two days.

The gum tragacanth was prepared and left to stand in a similar manner, the batch containing 37 ounces of water and 3.75 ounces of the gum.

The soy bean protein was prepared and left to stand for 48 hours in a similar manner. I mixed 88 ounces of soy bean protein with 264 ounces of water and found that best results were obtained when water was added very slowly to soy bean protein while it was subjected to vigorous stirring to prevent lumping. Then the required percentage of citric acid and benzoate of soda were added and, while standing, the mixture was stirred every four or five hours.

The 200 pounds of sugar containing the 3 per cent corn starch was poured into a heated kettle. All the other materials were then poured on top of the sugar, the citric acid and benzoate of soda last. The total weight of citric acid in the mixture was 3.8 ounces, of benzoate of soda 1.9 ounces, and of water 458 ounces.

The ingredients in the kettle were maintained at a temperature of 100°–120° F. and mixed by means of a double acting agitator revolving at 22 revolutions per minute for 8 to 10 minutes.

The icing thus produced will adhere to the surface of chocolate without the latter being first provided with an adhesive coating, and will become hard and dry within 6–10 minutes.

If desired some coloring matter may be added to the water as well as some flavor, such as peppermint oil, salt, and other edible starches. Such additions may enhance the appearance or taste of the icing but do not affect its clinging qualities.

The gum tragacanth is added on account of its emulsifying quality without producing gumminess and stringiness of the resulting icing. One of the important advantages of my icing is that one can reduce to a minimum or completely avoid the use of starches, light starches, and dextrines which were so widely used to cheapen egg-white containing icing, and thus guard against the formation of mold.

It will be seen, therefore, that the addition of soy bean protein makes possible the sticking to chocolate of what amounts to a sugar and water mixture. Heretofore, this was possible only when the chocolate was first coated with a vegetable glaze, confectioners' shellac, tincture of benzoic compound, or the like.

There is no objection, except price, to the use of larger percentages of soy bean protein, but results obtained with less than 3% were so good that to increase it seems unnecessary. It is interesting to note in this connection that the addition of both soy bean protein and egg-white to the icing does not improve and probably detracts from the adhesive qualities of the icing. For instance, while .78 per cent soy bean protein or .78 per cent egg-white in an icing produced fair results as far as adhesiveness was concerned, no improvement was noticed when both were added. Icing containing 2.3 per cent of soy bean protein was much better in every respect than icing containing 1.56 per cent of soy bean protein and .78 per cent of egg-white, or .78 per cent of soy bean protein and 1.56 per cent of egg-white, or 1.95 per cent soy bean protein and .39 per cent of egg-white. Icing containing 1.83 per cent of soy bean protein produced results superior to icing containing 1.95 per cent of soy bean protein and .39 per cent of egg-white.

Albusoy is the only available soy bean derivative which I have found suitable for hard or royal icing which adhered to uncoated chocolate surface, probably because it was the only one on the market which was completely free from fats.

Obviously, when a soft icing or a hard icing measured by less rigid standards is required, the addition of soy bean protein will effect some or all the improvements herein outlined. Furthermore, in these cases other soy bean preparations or derivatives may be used since the presence of other substances than proteins, such as fats is permissible.

What is claimed is:

As a new article of manufacture, a product having a chocolate surface, an icing firmly adhering thereto and consisting principally of sugar, water, and a small percentage of soy bean proteins.

JULIAN A. JOFFE.